United States Patent [19]

Okauchi et al.

[11] Patent Number: 4,807,069
[45] Date of Patent: Feb. 21, 1989

[54] APPARATUS USING DISC-SHAPED RECORD BEARING MEDIUM

[75] Inventors: Shigeki Okauchi; Tsukasa Uehara, both of Tokyo, Japan

[73] Assignee: Canon Kabushiki Kaisha, Tokyo, Japan

[21] Appl. No.: 83,011

[22] Filed: Aug. 5, 1987

Related U.S. Application Data

[63] Continuation of Ser. No. 637,392, Aug. 3, 1984, abandoned.

[51] Int. Cl.$^4$ .................... G11B 5/012; G11B 25/04
[52] U.S. Cl. ................................. 360/99.06; 369/270
[58] Field of Search ................................. 360/97–99; 369/263, 270–271; 358/906

[56] References Cited

U.S. PATENT DOCUMENTS 4,409,630 10/1983 Saito ......................................... 360/99
4,498,161 2/1985 Eisemann ........................... 369/75.2
4,509,157 4/1985 Morinaga ........................... 369/270 X Primary Examiner—A. J. Heinz
Attorney, Agent, or Firm—Toren, McGeady & Associates

[57] ABSTRACT

An apparatus arranged to use a flexible magnetic disc housed in a cassette and having a center core provided with an engaging hole, including a disc rotating spindle having a flange and engageable with the hole at the center core of the disc, a cassette holder movable between a first position for receiving the cassette and a second position for positioning the received cassette at a predetermined position relative to the spindle, a pressing device for pressing the center core of the disc against the flange of the spindle, and a control circuit for causing the pressing device to operate for a predetermined period of time in a condition where the cassette holder has been moved to its second position.

13 Claims, 5 Drawing Sheets

FIG. 8(a) OUTPUT OF 27
FIG. 8(b) OUTPUT OF 28
FIG. 8(c) OUTPUT OF 29

APPARATUS USING DISC-SHAPED RECORD BEARING MEDIUM

This is a continuation of application Ser. No. 637,392, filed Aug. 3, 1985, now abandoned.

BACKGROUND OF THE INVENTION

1. Field of the Invention

This invention relates to an apparatus using a disc-shaped record bearing medium, such as a disc recording and/or reproducing apparatus.

2. Description of the Prior Art

In the recording and/or reproducing apparatus using a rotation type record bearing medium of disc-shape, for example, rotation type flexible magnetic disc, rotation of the magnetic disc is performed after an engaging hole of a center core in the central portion of the magnetic disc has been engaged with a spindle which is driven to rotate by an electric motor. This type of apparatus has a problem that when the engagement of the center core with the spindle is loose, it becomes impossible to make sure the magnetic disc underdoes normal rotative motion during recording or reproduction, and conversely when the aforesaid engagement is tightened, the magnetic disc becomes difficult to load on the spindle.

Therefore, as will be more fully described later with reference to FIG. 2, a method has been proposed wherein a magnetizable member is applied to the center core, while a magnet piece is mounted on the flanged portion of the spindle. However, even in such a magnetic coupling method, it is difficult to assure that when the center core is put on the spindle, it takes a certain position relative to a reference surface, for example, the flange surface of the spindle. Therefore, it is difficult to hold the magnetic disc in a predetermined setting surface for maintenance of a predetermined aligning state between it and a recording and/or reproducing head. Also in a still picture recording and/or reproducing apparatus having the rigorous requirement for accuracy of alignment, the force necessary to load the center core on the spindle amounts up to hundreds of grams. Therefore, the magnet piece becomes of large size, and thus, the size and weight of the apparatus is hindered from being reduced.

On the other hand, there has been proposed an apparatus provided with a mechanism for pressing a portion of the magnetic disc against the spindle during the rotation of apparatus, that portion of the apparatus which rotates the disc operates under the condition that the aforesaid pressing mechanism applies a pressure on the spindle through the disc, its load becomes large, causing the speed of rotation to vary at random.

In order to overcome above-described difficulties, U.S. patent application Ser. No. 591,383 (abandoned) filed Mar. 20, 1984 assigned to the same assignee discloses an apparatus provided with pressing means for forcedly pressing the engaging portion of the record bearing medium on the rotative spindle at the time of loading the record bearing medium.

SUMMARY OF THE INVENTION

This invention relates to an improvement of the invention disclosed in the above-mentioned prior application and a main object thereof is to eliminate the above-described drawbacks of the prior art apparatus and to provide an apparatus using a disc-shaped record bearing medium which apparatus is capable of always assuring that when loading the disc-shaped record bearing medium, the record bearing medium is set on a rotative drive member accurately and reliably.

Another object of the present invention is to provide an apparatus using a disc-shaped record bearing medium which apparatus operates without having to apply a large load on the aforesaid rotative drive member during the rotation of the medium, thereby giving an advantage in that the bulk and size of the rotative drive member can be reduced.

Still another object of the present invention is to provide an apparatus using a disc-shaped record bearing medium in which the record bearing medium is loaded on a rotative drive member by pressing a portion of the record bearing medium against a receiving surface of the rotative drive member with a simple and low cost means or mechanism.

Under these objects, according to preferred embodiments embodying an aspect of the present invention, an apparatus arranged to use a disc-shaped record bearing medium having an engaging portion, comprises rotating means engageable with the medium at its engaging portion and having a surface for receiving the engaging portion of the medium; pressing means for pressing the engaging portion of the medium against the receiving surface of the rotating means; and control means for causing the pressing means to operate for a predetermined period of time.

In the embodiments, the apparatus further comprises positioning means such as movable holder means for placing the medium at a predetermined time relative to the rotating means, and wherein the control means is arranged to cause the pressing means in a condition that the medium is placed at the predetermined position by the positioning means.

Still another object of the present invention is to provide a recording and/or reproducing apparatus which assures that at the time of loading the record bearing medium the operation time of the above-mentioned pressing means is properly controlled so that the bearing medium is loaded and connected safely, reliably and surely.

Under this object, according to a preferred embodiment embodying another aspect of the present invention, the control means is arranged to cause the pressing means to operate when a predetermined waiting period of time has elapsed after the placement of the medium at the predetermined position by the positioning means.

In this invention, the term "record bearing medium" refers to a rotatable record bearing medium of disc-shape in the magnetic, optical, or electrostatic capacity type recording and/or reproducing system, and the term "rotating means" for the record bearing medium refers to a rotative drive member such as a spindle connected to, or driven by, a drive source such as an electric motor.

Other objects and features of the present invention will become apparent from the following description of the explanation by reference to the accompanying drawings.

BRIEF DESCRIPTION OF THE DRAWINGS

In the following, this invention will be described in connection with preferred embodiments thereof by reference to the accompanying drawings in which;

FIG. 3A shows the state in which the cassette holder has been raised. FIG. 3B shows the state in which the cassette holder has been lowered. FIG. 3C is a sectional view of pressing means in operation in the state the cassette holder has been lowered.

FIG. 5A is a side sectional view of the pressing means. FIG. 5B is a side view of the pressing means in contact with the upper surface of the center core.

FIG. 6A shows the state in which the cassette holder has been raised. FIG. 6B shows the state in which the cassette holder has been lowered. FIG. 6C shows the pressing means in operation in the state in which the cassette holder has been lowered.

FIGS. 8(a), 8(b) and 8(c) are timing charts of the respective portions of the circuit in FIG. 7.

DETAILED DESCRIPTION OF THE PREFERRED EMBODIMENTS

Figure 1:
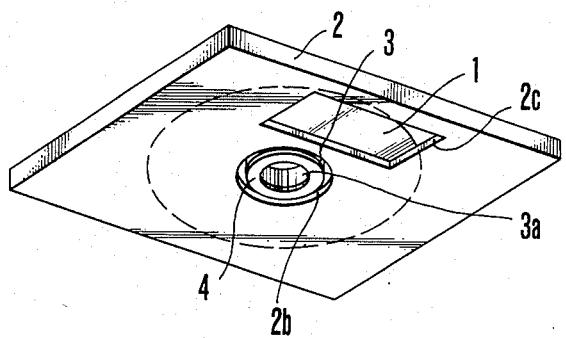
FIG. 1 is a perspective view of a known magnetic disc cassette.

The prior art apparatus using the disc-shaped record bearing medium (FIG. 1 and FIG. 2):

Prior to the description of a prior art apparatus using the disc-shaped record bearing medium, a known magnetic disc cassette is explained with reference to FIG. 1. In the drawings, 1 is a flexible magnetic disc as an example of a disc-shaped record bearing medium; 2 is a cassette containing the magnetic disc 1 and has a housing in the box form as illustrated in the drawing; 3 is a center core fixedly attached to a central portion of the magnetic disc 1 and having an engaging hole 3a; 2a and 2b are apertures provided in portions of the cassette 2 in correspondence to the center core 3; 2c is a window provided in a portion of the cassette 2 so as to allow insertion of a magnetic head to be described later; and 4 is a magnetizable plate fixedly attached to the lower surface of the center core 3. The magnetic disc 1 while being contained in the cassette 2 is loaded into a recording and/or reproducing apparatus by, for example, means to be described later, and then recording or reproducing is carried out in a manner known in the art.

Figure 2:
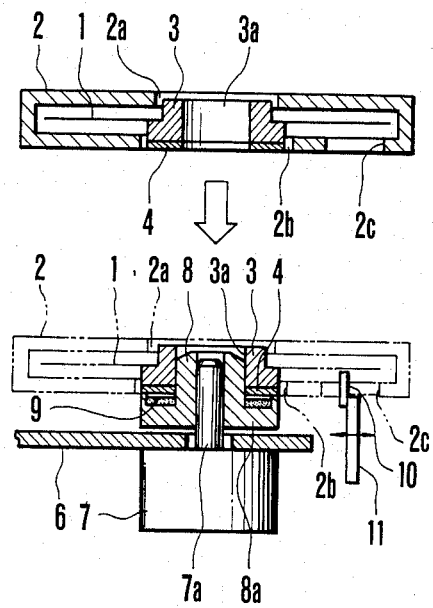
FIG. 2 is a sectional view of the main parts of a prior art apparatus.

FIG. 2 illustrates the main parts of the conventional apparatus using the disc-shaped record bearing medium in which the loaded cassette 2 is indicated by twodotted and dashed lines. Members denoted by the same reference characters as those in FIG. 1 have similar constructions and functions to those of the members of FIG. 1. As to other members, 6 is an internal chassis of the recording and/or reproducing apparatus; 7 is an electric motor for rotation of the disc and is fixedly mounted to the chassis; 8 is a spindle as an example of a rotating means fixedly mounted on an output shaft 7a of the disc rotation motor 7. The aforesaid center core 3 is adapted to be mounted on the spindle 8 at the engaging hole 3a thereof. 10 is a magnetic head as an example of the recording and/or reproducing head; 11 is a head carriage. 9 is a magnet fixedly mounted on the upper surface of a flange portion 8a of the spindle 8. According to the prior art, it is by this magnet 9 and the magnetizable plate 4 of the center core 3 that the center core 3 and the spindle 8 are brought into coupling with each other magnetically. By this method, however, as has been described above, it is difficult to assure that the magnetic disc 1 is maintained in a predetermined mounting surface defined by the flange portion 8a of the spindle 8.

In another prior art example where use is made of a mechanism acting on the upper surface of the center core 3 and pressing it against the spindle 8, as has been mentioned above, the disc rotating motor 7 is caused to operate with this mechanism also as a load. The total load of the motor 7 is, therefore, increased, which becomes a cause of uneven speeds of rotation.

Figure 3A:
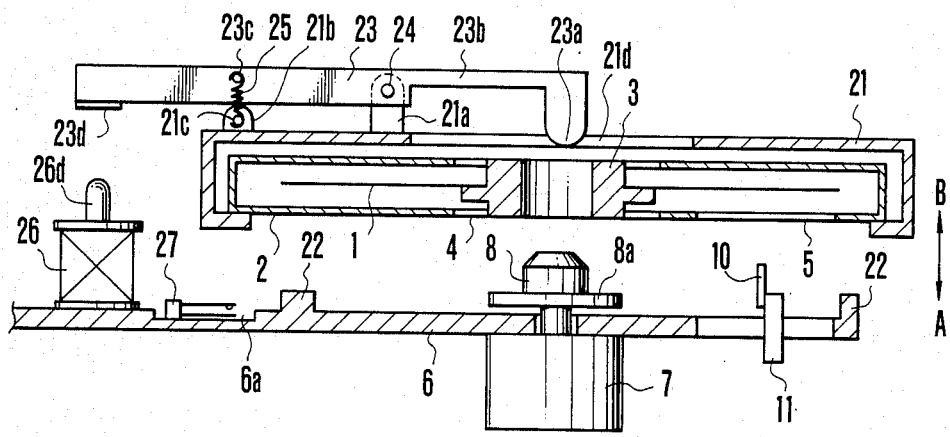
FIGS. 3A, 3B and 3C are sectional views of essential parts of a first embodiment of the present invention.
Figure 3B:
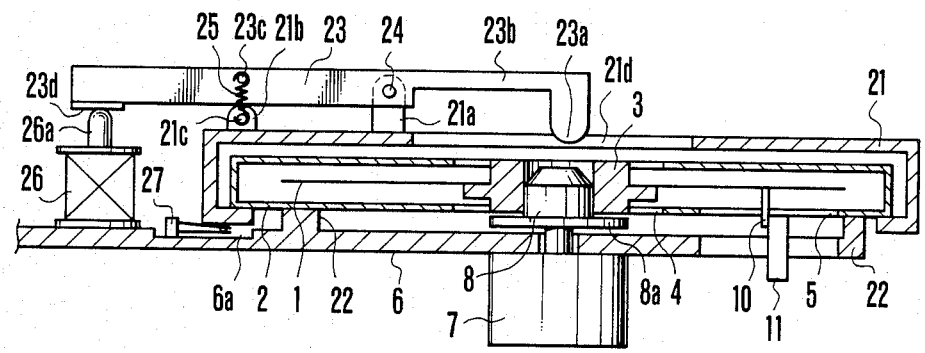
Figure 3C:
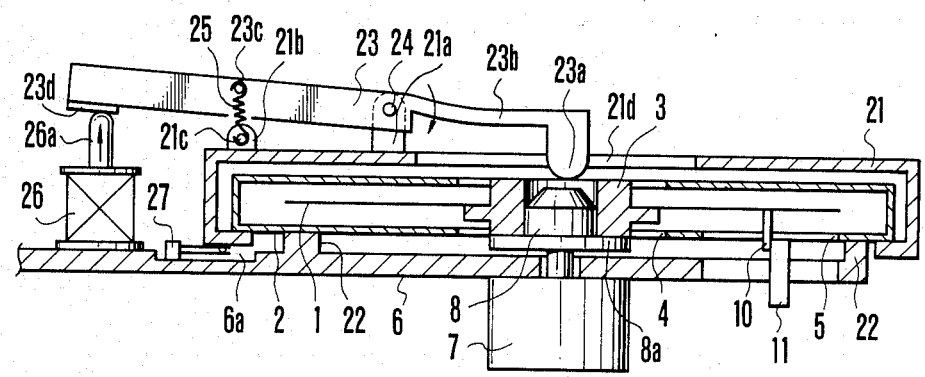

A first embodiment of the present invention (FIGS. 3 and 4):

In FIGS. 3A to 3C, the same reference numerals have been employed to denote the parts having fundamentally similar constructions and functions to those of the parts in FIGS. 1 and 2, and their explanation is omitted.

In FIGS. 3A to 3C, 21 is a cassette holder as an example of movable positioning means for positioning the cassette 2 at a predetermined recording or reproducing position. The cassette holder 21 is movable in the direction of the arrows A and B as is shown in FIG. 3A so that the cassette 2 is inserted into the holder 21 and loaded at the recording or reproducing position or taken out of the recording and/or reproducing apparatus from the holder 21. Here, the cassette holder 21 is movable relative to the chassis 6 by suitable means (not shown) between the upper position shown in FIGS. 3A at which the cassette 2 is inserted and taken out and the lower position shown in FIGS. 3B and 3C at which the recording or the reproduction is made, at which it is positioned by suitable means (not shown). 22 are support portions for the cassette 2, which can be provided on the chassis 6, or made as one unit with the chassis 6, or separated from the chassis 6.

23 is an arm constituting the pressing means and rotatable around a shaft 24. The shaft 24 is provided on the rising up portion 21a on the upper surface of the cassette holder 21. 23a is a pressure portion of the arm 23. Along with the rotation of the arm 23 in the clockwise direction as is shown in FIG. 3C, the pressure portion 23a presses the center core 3 against the spindle 8 through an opening 21d of the cassette holder 21. For this purpose, for example, two edge-shaped pressure portions 23a may be provided in such a manner that the upper surface of the center portion of the center core 3 is pressed at two points, namely, the upper side and the lower side of the paper plane of FIG. 3A or a ceiling plate may be provided on the upper surface of the center core 3 in such a manner that the pressure portion 23a presses the central portion of the ceiling plate.

Further, when the center core 3 is pressed against the spindle 8, the flange portion 8a of the spindle 8 serves as the reference surface for determining the height of the disc 1 relative to the head 10. Further, a portion 23b following the pressure portion 23a of the arm 23 is made as a narrow neck portion as is shown in the drawing, while the whole arm 23 is constituted, for example, with plastic material, so that the surplus pushed-in operation amount to the center core 3 can be absorbed by the narrow neck portion 23b as is shown in FIG. 3C.

25 is a spring for urging the arm 23 in the counterclockwise direction and provided between a spring hanging pin 23c on the arm 23 and a spring hanging pin 21c on the rising up portion 21b of the cassette holder 21. Further, due to the contact of the end of the rising up portion 21b with the surface of the lower end of the tail portion of the arm 23, the rotation of the arm 23 in the counterclockwise direction is restricted, while when both of them are in contact with each other, the pressure portion 23a of the arm 23 is maintained not to enter into the inner space of the cassette holder 21 as is shown in FIGS. 3A and 3B.

26 is a solenoid constituting pressing means together with the arm 23 secured on the chassis 6. 26a is an armature rod of the solenoid 26, which projects by a predetermined amount by the magnetic force when a current is supplied to the solenoid 26. As is shown in FIG. 3B, the solenoid 26 is provided in such a manner that when the arm 23 is lowered together with the cassette holder 21, the armature rod 26a approaches and faces a bent portion 23d at the tail end of the arm 23.

27 is a normally open type switch as an example of detecting means for detecting that the cassette holder 21 is lowered so as to position the cassette 2 at the above-predetermined recording or reproducing position. The switch 27 is provided on a concave portion 6a on the chassis 6 so as to be closed by a part of the lower surface of the cassette 2 when the cassette holder 21 has been lowered as is shown in FIGS. 3B and 3C.

Figure 4:
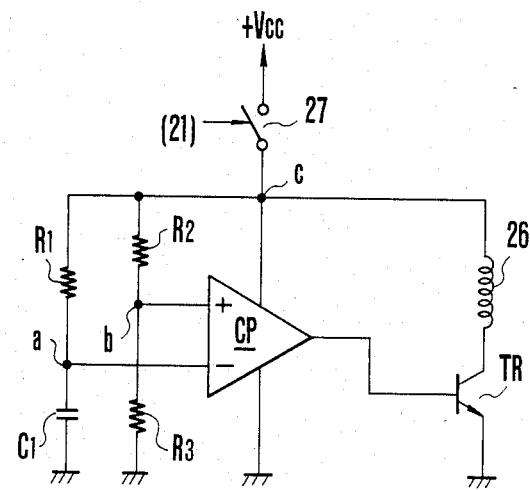
FIG. 4 shows a control circuit associated with the apparatus in FIGS. 3A, 3B and 3C.

FIG. 4 shows a control circuit for the above solenoid 26. A capacitor C1 and a resistor R1 constitute a CR time constant circuit, while resistors R2 and R3 constitute a voltage dividing circuit, both of which constitute a bridge circuit. CP is a comparator to whose noninversing input the potential at the connecting point "b" of the voltage dividing circuit is given and to whose inversing input the potential at the connecting point "a" of the CR time constant circuit is given, whereby the potential at the connecting point "b" of the voltage dividing circuit is taken as the reference voltage with which the potential at the connecting point "a" of the CR time constant circuit is compared. TR is an npn type switching transistor to whose base the output of the comparator CP is given and to whose collector the solenoid 26 is connected. The normally open type switch 27 to be closed with the lowering of the cassette holder 21 is connected between the connecting point "c" between the bridge circuit and the solenoid 26 and a D.C. power source (not shown).

The operation of the first embodiment will be described below.

In the above construction, the magnetic cassette 2 is inserted into the cassette holder 21 in the state in which the cassette holder 21 has been raised as shown in FIG. 3A and thereafter the holder 21 is lowered in the direction of the arrow A. For this purpose, it is sufficient to connect the holder 21 to the apparatus main body or its cover portion, for example, by the hinge provided on the back side of the paper plane of FIGS. 3A to 3C and lower the cassette holder 21 manually or by suitable drive means.

As is shown in FIG. 3B, when the cassette holder 21 has been lowered, it is locked at the lowered position by suitable means (not shown). At this time the bent portion 23d at the tail end of the arm 23 approaches and faces the armature rod 26a of the solenoid 26 and the end of the cassette holder 21 closes the normally open type switch 27. When the normally open type switch 27 is closed, in FIG. 4 the D.C. voltage is applied to the bridge circuit, the comparator CP and the solenoid 26. Because in FIG. 4 the potential at the connecting point "a" of the CR time constant circuit is lower than that at the connecting point "b" of the voltage dividing circuit in the initial state in which the switch 27 has been closed, the level of the output of the comparator CP becomes high so that the transistor TR becomes conductive and a current is supplied to the solenoid 26. When a current is supplied to the solenoid 26, as is shown in FIG. 4, the armature rod 26a projects and pushes up the bent portion 23d at the tail end of the arm 23 so as to rotate the arm 23 in the clockwise direction against the force of the spring 25. Thus the center core 3 of the magnetic disc 1 is brought in contact with the flange surface 8a of the spindle 8.

In this case, the surplus pushed-in operation amount is absorbed by the bending of the narrow neck portion 23b of the arm 23 as is shown in FIG. 3C so that there is no fear that the center core 3 of the disc 1 and the flange surface 8a of the spindle 8 would be damaged.

After the lapse of a predetermined time (for example, several seconds) after the switch 27 is closed, in the circuit shown in FIG. 4, the potential at the connecting point "a" of the CR time constant circuit becomes higher than that at the connection point "b" of the voltage dividing circuit. Thus, the level of the output voltage of the comparator CP changes from high to low so that the transistor TR becomes non-conductive so as to stop the current supply to the solenoid 26. When the current supply to the solenoid 26 is stopped, the armature rod 26a is lowered, so that the arm 23 is rotated in the counterclockwise direction by the spring 25 until the state shown in FIG. 3B is assumed, and the pressing operation of the pressure portion 23a of the arm 23 to the center core 3 is stopped.

As is described above, in the case of this embodiment, the arm 23 as pressing means is operated for predetermined period of time by the circuit shown in FIG. 4, whereby the center core 3 is pressed against the spindle 8, and thereafter the pressing operation is stopped after the lapse of a predetermined period of time.

The present invention does not hinder the arrangement similar to the prior art apparatus described in FIG. 2 in which the permanent magnet 9 is provided on the flange portion 8a of the spindle 8, while a soft magnetizable body (attraction plate) 4 is provided on the lower surface of the center core 3 so that the chucking of the disc 2 by the magnetic attracting force is used together.

In a case where it is desired that the video camera is operated quickly, for example, it is necessary to carry out quickly a series of operations that the cassette 2 is loaded in the recording apparatus and the disc rotating motor 7 is driven. At this time it is important to cause the rotation speed of the disc rotation motor 7 to reach a predetermined speed quickly while the disc cassette 3 is loaded in order to record pictures with good quality.

Here, an example in which the pressure portion of the center core pressing arm shown in FIGS. 3A to 3C, is arranged to be rotatable relative to the center core 3 will be described with reference to FIGS. 5A and 5B.

Figure 5A:
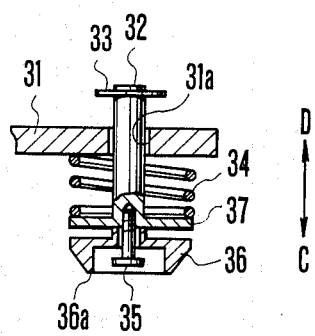
FIGS. 5A and 5B show a modification of the pressing means.
Figure 5B:
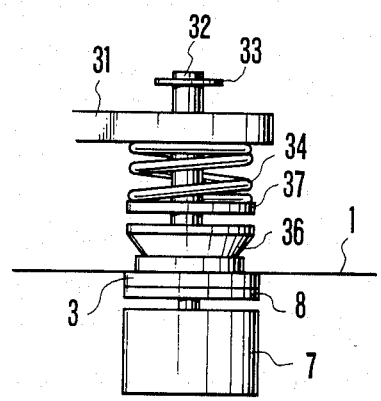

In FIG. 5A, 31 is an arm replaceable for the arm 23 shown in FIGS. 3A to 3C, rotatable in the clockwise direction by the force of the solenoid 26 shown in FIGS. 3A to 3C. The arm 31 may be provided or not provided with a partially flexible narrow neck portion similar to the arm 23 in FIGS. 3A to 3C. 31a is a penetrating hole provided at the end of the arm 31. In the hole 31a a connecting rod 32 is inserted so as to be rotated freely and slidable in the direction of the arrows C and D. In the upper end of the connecting rod 32, a pin 33 is inserted in the diametrical direction so that the rod 32 is prevented from being pulled out from the hole 31a. 37 is a disc-shaped member secured at the lower end of the connecting rod 32. A spring 34 is arranged between the disc-shaped member 37 and the lower surface of the end of the arm 31. At the lower end of the connecting rod 32 a conical pressure member 36 having a ring-shaped flat surface 36a which is brought into contact with the upper surface of the center core 3 is arranged by a screw 35 so as to be freely rotatable. Here, it is possible to use a cylindrical pressure member having a ring-shaped flat surface instead of the conical pressure member 36.

In the above construction, when the switch 27 is closed as is shown in FIG. 3B with the lowering of the cassette holder 21, the solenoid 26 is engaged and the arm 31 is rotated in the clockwise direction. Thus, the ring-shaped flat surface 36a of the conical pressure member 36 is brought into contact with the upper surface of the center core 3. With further rotating operation of the arm 31 in the clockwise direction the arm 31 applies pressure to the surface at the upper end of the center core 3 through the spring 34 and the conical pressure member 36. At this time, as the conical pressure member 36 is freely rotatable relative to the disc shaped member 37, it applies a pressure to the center core 3 while it rotates with the center core 3 rotated by the spindle 8, and mounts the disc 1 on the spindle 8. Then, when the current supply to the solenoid 26 is stopped by the operation of the circuit shown in FIG. 4, the arm 31 is rotated back in the counterclockwise direction, while the conical pressure member 36 leaves the center core 3.

As is clear from the above explanation, the conical pressure member 36 which applies pressure to the center core 3 is constructed to be rotated freely, therefore it does not give a large load to the rotating driving part even when the center core 3 starts rotation so that the disc rotating motor can reach a predetermined rotation speed quickly, without being largely loaded. Namely, the time needed for the disc rotating motor to reach the predetermined rotation speed is not prolonged, the servo system is not disturbed and further any noises due to friction are not produced even during the pressure operation.

Figure 6A:
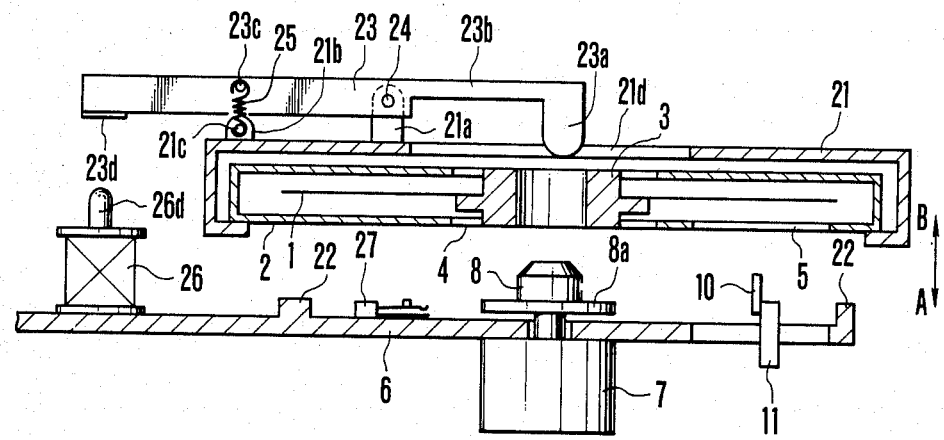
FIGS. 6A, 6B and 6C are sectional views of essential parts of a second embodiment of the present invention.
Figure 6B:
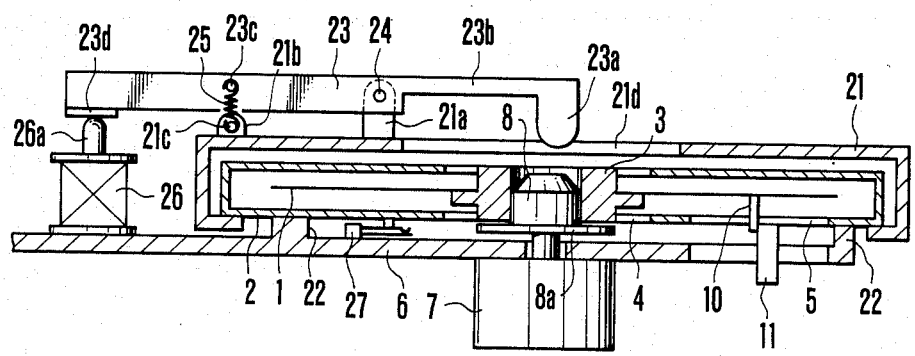
Figure 6C:
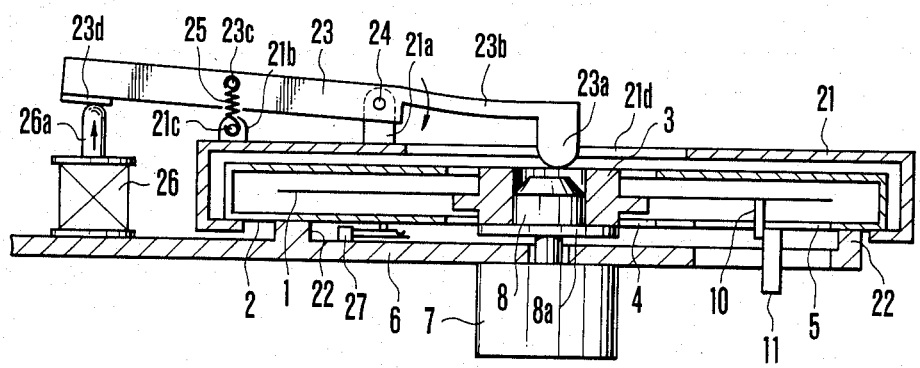

A second embodiment of the present invention (FIGS. 6 to 8):

In FIGS. 6A to 6C, the same reference numerals which have been employed to denote the parts have fundamentally similar constructions and functions to those of the parts in FIGS. 1, 2 and 3A to 3C, and their explanation is omitted.

The only difference between the construction of the apparatus shown in FIGS. 6A to 6C and that of the apparatus shown in FIGS. 3A to 3C is that the normally open type detecting switch 27 is provided on the chassis 6 so as to be closed not by the lower surface of the cassette holder 21 but by the lower surface of the magnetic disc cassette 2 held by the cassette holder 21 when the magnetic disc cassette 2 is positioned at the predetermined recording or reproducing position. Namely, the pressing arm 23 is operated only when the holder 21 has been lowered in the state in which the cassette 2 is inserted in the holder. Namely, even when the holder 21 is lowered, it is not operated when the cassette 2 is not inserted in the holder 21.

Figure 7:
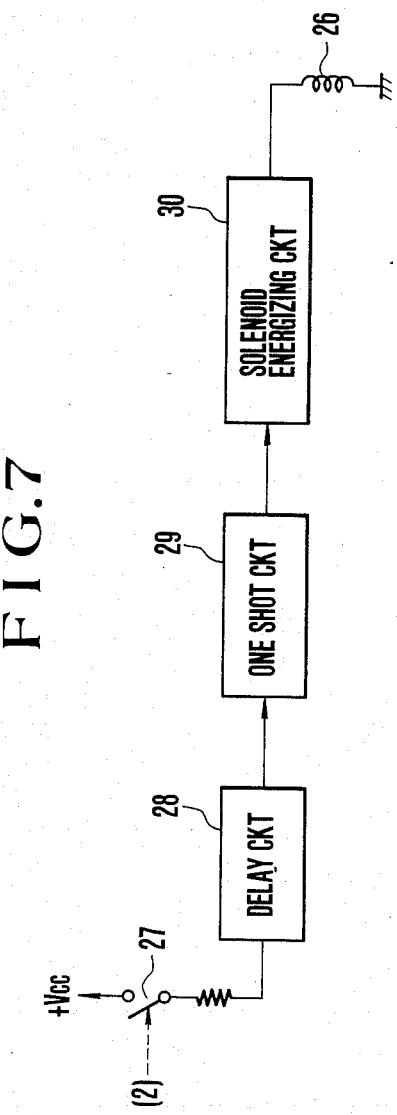
FIG. 7 shows a control circuit associated with the apparatus in FIGS. 6A, 6B and 6C.
Figure 7:
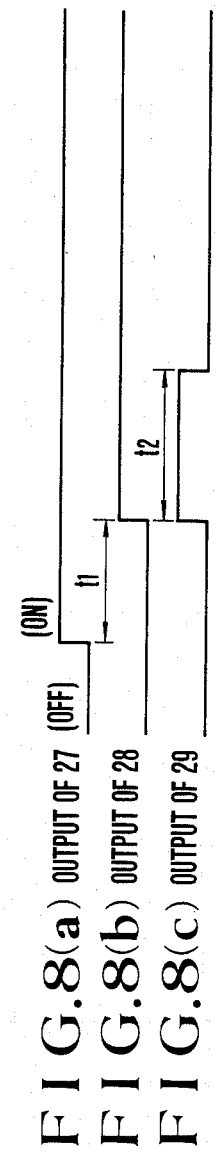

FIG. 7 shows the control circuit for the solenoid 26 in the present embodiment. In the drawing 28 is a delay circuit for delaying the high level signal (FIG. 8(a)) produced by the closing of the switch 27 for a predetermined period of time t1, more concretely, a relatively short period of time necessary to stabilize the cassette 2 after the cassette 2 assumes the recording or reproducing position shown in FIG. 6B, 29 is a one shot circuit (monostable multivibrator) for producing a signal (FIG. 8(c)) which is high for a predetermined period of time t2 in response to a high level output (FIG. 8(b)) from the delay circuit 28, more concretely, for a time period necessary for supplying a current to the solenoid 26 so as to operate the arm 23 in order to push the center core 3 on the spindle 8 surely until the center core 3 abuts on the reference surface of the flange portion 8a and 30 is a solenoid energizing circuit for supplying a current to the solenoid 26 for the predetermined time period t2 in response to the high level signal from the one shot circuit 29, whereby they constitute control means for controlling the pressing means composed of the solenoid 26 and the arm 23.

In the above construction, the magnetic disc cassette 2 is inserted into the cassette holder 21 in the raised state shown in FIG. 6A and then the holder 21 is lowered in the direction of the arrow A.

When, as is shown in FIG. 6B, the cassette holder 21 has reached the lowered position, the bent portion 23d of the tail end of the arm 23 approaches and faces the armature rod 26a of the solenoid 26, while the normally open type switch 27 is closed by the cassette 2. As understood from FIGS. 8(a) and 8(b), when the normally open type switch 27 is closed, the level of the output of the delay circuit 28 becomes high after the lapse of the predetermined time period t1, in response to which the one shot circuit 29 produces a high level signal as is shown in FIG. 8(c). In response to the high level output from the one shot circuit 29 the solenoid energizing circuit 30 supplies a current to the solenoid 26. When a current is supplied to the solenoid 26, the armature rod 26a projects as is shown in FIG. 6C so that the bent portion 23d at the tail end of the arm 23 is pushed up so as to rotate the arm 23 in the clockwise direction against the force of the spring 25, whereby the center core 3 of the magnetic disc 1 is pushed by the pressure portion 23a as is shown in FIG. 3C until the center core 3 is brought in contact with the flange surface of the flange portion 8a of the spindle 8.

Then, after the lapse of the above predetermined time period t2 after the level of the output of the one shot circuit 29 becomes high, the level of the output of the one shot circuit 29 becomes low so that the solenoid energizing circuit 30 stops the current supply to the solenoid 26 When the current supply to the solenoid 26 is stopped, the armature rod 26a is lowered and the arm 23 is rotated by the spring 25 in the counterclockwise direction, and then the state shown in FIG. 6B is assumed and the pressing operation of the center core 3 by the pressing end 23a of the arm 23 is stopped.

As described above, in the case of the present embodiment, the arm 23 as the pressing means is operated for the predetermined time period t2 after the lapse of the predetermined time period t1 after the cassette 2 assumes the recording or reproducing position by the circuit shown in FIG. 7, in such a manner that the center core 3 is pressed against the spindle 8 and when the predetermined time period t2 elapsed, the pressing operation is stopped. Namely, the center core 3 is pressed only for the predetermined time period after the cassette 2 assumes the predetermined recording or reproducing position and is stabilized, namely after the cassette 2 has been securely loaded.

As described above in detail, according to the present invention, all of the shortcomings of the prior art recording and/or reproducing apparatus mentioned at the beginning are eliminated in such a manner that it is possible to engage the engaging portion of the record bearing medium on the rotating driving portion of the rotating driving means correctly and surely so as to guarantee the contact of the rotating record bearing medium with the recording or reproducing head to be maintained in a predetermined state, while it is possible to realize a compact rotating driving means without applying a large load for the rotating driving means during the rotation of the record bearing medium. Further, by controlling the operation of the pressing means at the time of loading the record bearing medium, it is possible to guarantee a smooth, safe and sure mounting at the time of loading the record bearing medium, which is remarkably advantageous for this kind of recording and/or reproducing apparatus.

Further, it is possible to arrange the detecting switch 27 in the first embodiment in FIGS. 3 and 4 in such a manner that the lowering of the cassette 2 is detected as in the case of the second embodiment shown in FIGS. 6 to 8. Further, it is possible to replace the construction shown in FIG. 5 for the pressing arm 23 in the second embodiment. Further, it is possible to arrange the solenoid 26 in the first embodiment as well as the second embodiment not on the chassis but on a part of the cassette holder 21 together with the arm 23. Further, it is possible to make use of a driving source such as a motor instead of the solenoid 26.

What is claimed is:

1. An apparatus arranged to handle a disc having an engaging portion, said apparatus comprising:
   (A) rotating means for rotating said disc, said rotating means having an engageable portion engageable with said engaging portion of the disc and a receiving surface for receiving thereon the engaging portion of the disc;
   (B) pressing means for pressing said engaging portion of the disc against said receiving surface of the rotating means; said pressing means being movable between a contact position and a remote position, while in said contact position said pressing means engages and presses said engaging portion and while in said remote position said pressing means is in noncontacting relationship with said engaging portion; and
   (C) control means for causing said pressing means o automatically move to said contact position and retaining said pressing means at said contact position for a predetermined period, and subsequently causing said pressing means to move to said remote position in advance of disc rotation.

2. The apparatus according to claim 1, further comprising:
   positioning means for placing the disc at a predetermined position relative to said rotating means, said control means responding to the placement of the disc at said predetermined position by said position means for causing said pressing means to move to said contact position for said predetermined period when the disc is placed at the predetermined position.

3. The apparatus according to claim 2, wherein said control means causes said pressing means to move to said contact position after a predetermined waiting period of time has elapsed after the placement of the disc at said predetermined position.

4. The apparatus according to claim 2, wherein said positioning means includes:
   a disc holder for holding the disc, said holder being movable between a first position for receiving the disc and a second position for placing the received disc at said predetermined position relative to said rotating means.

5. The apparatus according to claim 1, wherein said pressing means includes:
   a pressing member for pressing the engaging portion of the disc, said pressing member being movable between said contact position and said remote position; and
   an electro-magnetic member for moving said pressing member, said control means causing said electro-magnetic member to move said pressing member to said contact position for said predetermined period of time.

6. A recording and/or reproducing apparatus arranged to use a disc-shaped record bearing medium having an engaging portion, said apparatus comprising:
   (A) recording and/or reproducing head means for recording signals on and/or reproducing recorded signals from said record bearing medium;
   (B) rotating means for rotating the medium relative to said head means, said rotating means being engageable with said engaging portion of the medium and having a receiving surface for receiving thereon the engaging portion of the medium;
   (C) positioning means for placing the medium at a predetermined position for signal recording and/or reproduction;
   (D) detection means for producing a characteristic signal when detecting that the medium is placed at said predetermined position by said positioning means;
   (E) pressing means for pressing said engaging portion of the medium against said receiving surface of the rotating means, said pressing means being movable between a contact position and a remote position, while in said contact position said pressing means engages and presses said engaging portion and while in said remote position said pressing means is in non-contacting relationship with said engaging portion; and
   (F) control means responsive to said characteristic signal produced from said detection means for causing said pressing means to automatically move to said contact position and retaining said pressing means at said contact position for a predetermined period, and subsequently causing said pressing means to move to said remote position in advance of rotation of said medium.

7. The apparatus according to claim 6, wherein said control means causes said pressing means to move to said contact position after a predetermined waiting period of time has elapsed after said detection means has produced said characteristic signal.

8. The apparatus according to claim 6, wherein said positioning means includes:
   a holder for holding the medium, said holder being movable between a first position for receiving the medium and a second position for placing the received medium at said predetermined position for signal recording and/or reproduction.

9. The apparatus according to claim 6, wherein said pressing means includes:
   a pressing member for pressing the engaging portion of the medium, said pressing member being movable between said contact position and said remote position; and
   an electro-magnetic member for moving said pressing member, said control means causing said electro-magnetic member to move said pressing member to said contact position for said predetermined period of time.

10. An apparatus arranged to handle a flexible disc housed in a cassette and having a center core attached at a central portion thereof and provided with an engaging hole, said apparatus comprising:
   (A) a spindle engageable with said engaging hole of the center core of the disc for rotating said disc, said spindle having a flange portion for receiving thereon said center core;
   (B) a cassette holder positionable at a first position for receiving therein said cassette and a second position for placing the received cassette at a predetermined position relative to said spindle;
   (C) a pressure member for pressing said center core of the disc against said flange portion of the spindle to load the disc on the spindle;
   (D) an actuation member for actuating said pressure member to press the center core of the disc; and
   (E) a control circuit for causing said actuation member to operate said pressure member for a predetermined period of time in response to the placement of the cassette at said predetermined position by said holder in advance of said spindle rotating the disc.

11. An apparatus arranged to handle a flexible disc housed in a cassette and having a center core attached at a central portion thereof and provided with an engaging hole, said apparatus comprising:
   (A) a spindle engageable with said engaging hole of the center core of the disc for rotating said disc, said spindle having a flange portion for receiving thereon said center core;
   (B) a cassette holder positionable at a first position for receiving therein said cassette and a second position for placing the received cassette at a predetermined position relative to said spindle;
   (C) a pressure member for pressing said center core of the disc against said flange portion of the spindle to load the disc on the spindle;
   (D) an actuation member for actuating said pressure member to press the center core of the disc; and
   (E) a control circuit for causing said actuation member to operate said pressure member for a predetermined period of time when a predetermined second period of time has elapsed after the placement of the cassette at said predetermined position by the holder in advance of said spindle rotating the disc.

12. An apparatus for recording signals on and/or reproducing recorded signals from a flexible magnetic disc housed in a cassette and having a center core attached at a central portion thereof and provided with an engaging hole, said cassette having a window for exposing a portion of said disc, said apparatus comprising:
   (A) a magnetic head for recording signals on and/or reproducing recorded signals from the disc;
   (B) a spindle engageable with said engaging hole of the center core of the disc for rotating said disc, said spindle having a flange portion for receiving thereon said center core;
   (C) a cassette holder positionable at a first position or receiving therein said cassette and a second position for placing the received cassette at a predetermined position to cause the disc within the received cassette to gain access to said head through said window of the cassette;
   (D) a detection member for producing a characteristic signal when detecting that said holder is positioned at said second position;
   (E) a pressure member for pressing said center core of the disc against said flange portion of the spindle to load the disc on the spindle; and
   (F) actuation means for actuating said pressure member to effect said pressing for a predetermined period of time in response to said characteristic signal produced from said detection member in advance of said spindle rotating the disc.

13. An apparatus for recording signals on and/or reproducing recorded signals from a flexible magnetic disc housed in a cassette and having a center core attached at a central portion thereof and provided with an engaging hole, said cassette having a window for exposing a portion of said disc, said apparatus comprising:
   (A) a magnetic head for recording signals on and/or reproducing recorded signal from the disc;
   (B) a spindle engageable with said engaging hole of the center core of the disc for rotating said disc, said spindle having a flange portion for receiving thereon said center core;
   (C) a cassette holder for holding said cassette, said cassette holder being movable from a first to a second position for causing said disc within the held cassette to gain access to said head through said window of the cassette;
   (D) a pressure member for pressing said center core of the disc against said flange portion of the spindle to load the disc on the spindle;
   (E) a detection member for producing a characteristic signal when detecting that said holder is positioned at said second position;
   (F) circuit means responsive to said characteristic signal produced from said detection member for producing a control signal when a predetermined first period of time has elapsed after the detection member has produced the characteristic signal; and
   (G) actuation means for actuating said pressure member to effect said pressing for a predetermined second period of time in response to said control signal produced from said circuit means in advance of said spindle rotating the disc.

* * * * *

UNITED STATES PATENT AND TRADEMARK OFFICE
CERTIFICATE OF CORRECTION

PATENT NO. : 4,807,069
DATED      : February 21, 1989
INVENTOR(S): Shigeki Okauchi et al It is certified that error appears in the above-identified patent and that said Letters Patent is hereby corrected as shown below:

On the Title Page, add

--[30]   FOREIGN APPLICATION PRIORITY DATA

August 10, 1983   Japan ........... 58-146141

October 27, 1983  Japan ........... 58-201520--.

Signed and Sealed this

Nineteenth Day of September, 1989

Attest:

DONALD J. QUIGG

*Attesting Officer*    *Commissioner of Patents and Trademarks*